April 17, 1928.
A. F. VICTOR
1,666,077
FILM CONTAINER
Filed June 24, 1926
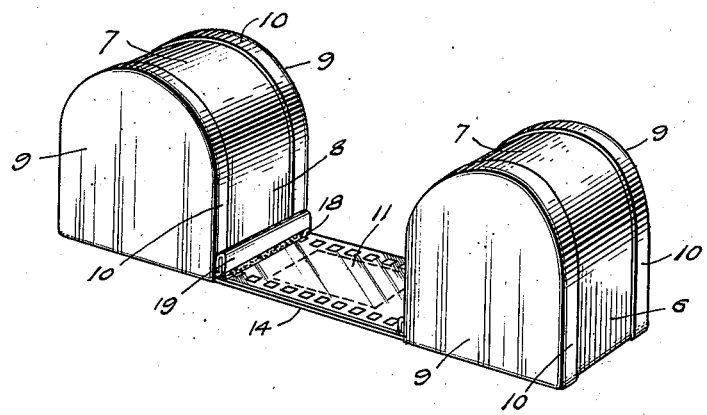
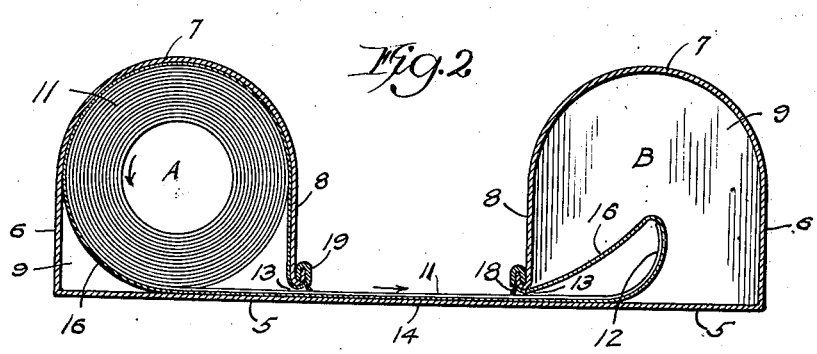
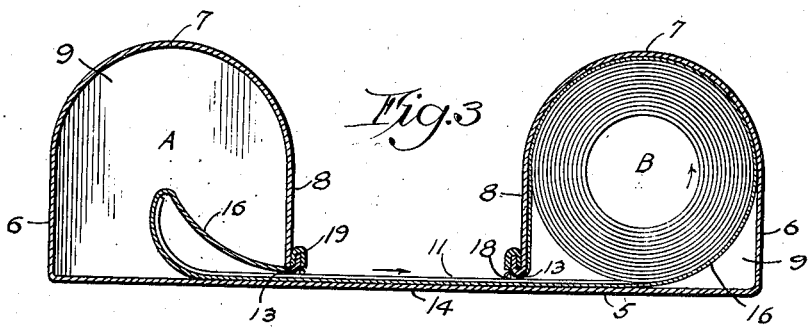
Witness:
Chas. R. Kursh.
Inventor.
ALEXANDER FERDINAND VICTOR.
Thomason & Lundy Attys.

Patented Apr. 17, 1928.

1,666,077

UNITED STATES PATENT OFFICE.

ALEXANDER FERDINAND VICTOR, OF DAVENPORT, IOWA.

FILM CONTAINER.

Application filed June 24, 1926. Serial No. 118,254.

My present invention relates to film containers for cameras and has particular reference to a container for retaining a relatively short length of narrow film, such as that used in cinematography, for a camera for taking "still" pictures. The structure consists of a pair of spaced chambers, connected by a web and the film is passed from one chamber to the other over the web so that a series of negatives may be taken on the film, and in connection with this structure I have provided a loose strip that maintains the film strip in coiled or rolled form in either or both of the chambers. Means are also provided for preventing light entering chambers through the film passageways or slits.

I prefer to carry out my invention and to accomplish the divers objects thereof in substantially the manner hereinafter fully described and as more particularly pointed out in the claims, reference being here made to the accompanying drawings that form a part of this specification.

In the drawings:—

Fig. 1 is a perspective of my film container looking at an end and one of its longitudinal sides.

Fig. 2 is a longitudinal section of the structure illustrated in Fig. 1 illustrating the film in the storage chamber and starting to roll in the receiving chamber.

Fig. 3 is a view similar to Fig. 2 except that the storage chamber has been almost emptied and the receiving chamber has been practically filled.

Fig. 4 is an enlarged fragmentary view showing the construction at the passageway or slit for the film.

The drawings, which are more or less schematic, illustrate a typical or preferred embodiment of my invention, and I have employed similar reference characters to designate like parts wherever they appear throughout the several views.

The container is made from sheet metal and preferably comprises an elongated strip, slightly wider than the film, a straight portion of which, designated as 5 on the drawings, is provided at its ends with laterally bent-up portions 6, 6, that extend straight a short distance and are then curved substantially semi-circular as at 7 and the ends of which extend towards the part 5 in straight portions 8. Thus the encircling walls of the chambers are formed from one piece of metal. End walls 9 close the opposite ends of the chambers thus formed, each of said walls 9 being provided with an edge flange 10 that fits against the edge portions of the respective walls 5, 6, 7 and 8, and said flanges are secured in position by soldering, brazing or otherwise. The spaced chambers are light-proof, as will hereinafter appear, the chamber A at the left being conveniently designated as the storage chamber and the chamber B at the right, the receiving chamber.

The film, as before stated, is of the standard motion picture type and a small roll 11 of the same is placed in the chamber A prior to the closing of the latter and the outer end portion 12 of the film strip is passed through slits or passageways 13 in the facing portions of the chambers A and B and also lies adjacent the web or neck 14 that connects the two chambers so that said end 12 will be inside the chamber B with the intermediate portion ready for exposure on the neck of the container. For the purpose of protection and guidance I have provided a flexible strip or leader tape 16, the ends of which are secured in a seam formed in the metal at the lower edges of the adjacent walls 8, as will be hereinafter described in detail, and said flexible strip or tape, which I prefer to be of opaque paper encloses the rolls of film within the chambers A and B. As seen in Fig. 2, the paper strip leads from the slot or slit 13 upwardly close to the wall 8 and around the film 11 in the chamber 8 and follows the film through the slit 13 of chamber A across the neck 14 through the slit 13 in chamber B and at first forms a small loop within the latter. As the film feeds from the storage chamber A to the receiving chamber B, the paper strip or leader tape moves slowly from one chamber to the other, the loop within the storage chamber gradually diminishing in size with the gradually reducing roll of film and gradually increasing in the receiving chamber B as more film is received therein until the other end portion of the film has been reached and the last pictures are to be taken. The relative positions of the parts at the beginning of the unrolling of the film and at the end of the unrolling are schematically illustrated in Figs. 2 and 3.

In order to make the chambers lightproof, I bend upwardly the lower end portions 17 of the walls 8 so as to form the slits 13 between the bent edges and the adjacent surface of the neck 14 and secure a looped strip 18 of plush, velvet or the like to the same by clamping thereon or thereto a metal strip 19 of inverted U-shape in cross section. At the same time that I position the plush loop 18, the ends of the paper leader tape or strip 16 are inserted in the securing means and the whole structure firmly clamped or pressed together to form a double seam. As observed in Fig. 4 a loop 18 extends down against the film and prevents light from passing through the slit 13 into either of the chambers A and B.

A film is intermittently moved by suitable mechanism that feeds a desired portion into position on the neck 14 between the storage and receiving chambers and after a still exposure has been made the film is again moved and the operation repeated a number of times until the entire strip has been utilized, thus feeding the roll of film from the storage chamber and winding it up again in the receiving chamber, while in the meantime the paper strip 16 is constantly surrounding the rolls of film in the respective chamber automatically accommodating itself to the varying diameter of the rolls. The mechanism for moving the film and the camera in which the film container is employed form the subject matter of my co-pending application, which was filed even date herewith, Serial No. 118,253.

What I claim is:—

1. A film container consisting of a walled storage chamber, a walled receiving chamber, and a substantially straight flat member providing a neck connecting said chambers in spaced relation, the walls of said chambers forming at all times a rigid portion of the container and are provided adjacent said neck with slits through which the film is passed from one chamber along the neck and into the other chamber.

2. A film container comprising two spaced compartments provided with elongated orifices in facing walls, a flat member connecting said compartments adjacent said orifices, and a leader tape looped within each of said compartments and guiding the film and having its ends anchored at suitable points to the walls of the respective compartments whereby the loops are varied during movement of the film.

3. A film container comprising two spaced compartments provided with elongated orifices, a neck connecting said compartments adjacent said orifices, and a leader tape looped within each of said compartments and guiding the film and the intermediate portion passed over said neck, the ends of said leader tape anchored at the orifices in the respective compartments whereby the loops are varied during movement of the film.

4. A film container comprising spaced compartment walls and a flat connecting member formed from a strip of material, end walls closing said compartments, said compartments provided with elongated orifices at the junctures of the first-named walls and said connecting member, and a web a portion of which is movable from one compartment to the other and looped around the film for maintaining the film in rolls in the respective compartments.

5. A film container comprising a pair of compartments provided with orifices for the passage of film therethrough, and a web extending from the interior of one compartment to the interior of the other compartment through said orifices and looped around the film within the respective compartments.

6. A film container comprising a pair of compartments having slitted walls, and a web movable through said slits from one compartment to the other and looped within the respective compartments around the film whereby said loops diminish and increase in size as the film is moved from one compartment to the other.

7. A film container consisting of a storage compartment, a receiving compartment, a member connecting said compartments in spaced relation to each other, said compartments provided with orifices adjacent said member, and yieldable sealing means extending across said orifices into engagement with said connecting means for normally closing said orifices.

8. A film container comprising a storage compartment, a receiving compartment, a member connecting said compartments in spaced relation to each other, said compartments provided with orifices adjacent said member, a leader tape looped around the film in each compartment and extending through the orifices, and sealing means yieldably urged towards said member for closing said orifices.

9. A film container comprising a pair of compartments provided with orifices for the passage of films therethrough, a web extending from the interior of one compartment through said orifices and into the other compartment, said web being looped around the film within the respective compartments, and yieldable sealing strips normally closing said orifices.

Signed at Davenport, in the county of Scott, and State of Iowa, this 25th day of May, 1926.

ALEXANDER FERDINAND VICTOR.